United States Patent [19]

Canzek

[11] Patent Number: 4,547,045
[45] Date of Patent: * Oct. 15, 1985

[54] HIGH SPEED CATADIOPTRIC OBJECTIVE LENS SYSTEM

[76] Inventor: Ludvik Canzek, Quellmattstrasse 3, 5035 Unterentfelden, Switzerland

[ * ] Notice: The portion of the term of this patent subsequent to Jun. 26, 2001 has been disclaimed.

[21] Appl. No.: 588,808

[22] Filed: Mar. 9, 1984

Related U.S. Application Data

[63] Continuation-in-part of Ser. No. 308,798, Oct. 5, 1981, Pat. No. 4,456,343.

[30] Foreign Application Priority Data

Oct. 17, 1980 [CH] Switzerland ................. 7753/80

[51] Int. Cl.⁴ ............................................. G02B 17/08
[52] U.S. Cl. .................................................. 350/444
[58] Field of Search ...................... 350/444, 443, 442

[56] References Cited

U.S. PATENT DOCUMENTS

| | | | |
|---|---|---|---|
| 3,507,556 | 4/1970 | Shimizu | 350/444 |
| 3,926,505 | 12/1975 | Rayces | 350/444 |
| 4,165,151 | 8/1979 | Momiyama | 350/444 |
| 4,188,091 | 2/1980 | Fujii | 350/444 |
| 4,456,343 | 6/1984 | Canzek | 350/444 |

Primary Examiner—John K. Corbin
Assistant Examiner—Scott J. Sugarman
Attorney, Agent, or Firm—Werner W. Kleeman

[57] ABSTRACT

This invention provides a high speed catadioptric objective system of F/1.2. The lens system comprises, in accordance with the advance of the light rays, a front or first single lens, a main mirror lens, a counter mirror and a field lens system. The counter mirror is mounted in front of the front lens in order to achieve a short overall length and a good correction of sphero-chromatic aberration. The counter mirror may serve as a focussing element or it may be fixedly mounted to the front lens. The present lens system is distinguished over similar prior art systems by its overall length, which has been reduced by 30 percent, sunshade included. The same type of glass is used for almost all lenses of five preferred embodiments in order to eliminate the secondary spectrum and to enable the objective to be used within a very broad spectral range. An almost perfect correction of aberrations has been achieved with only spherical element faces, thus the systems are suitable when maximum image quality and speed are required. They are useful also for low light level and IR spectral range applications.

9 Claims, 8 Drawing Figures

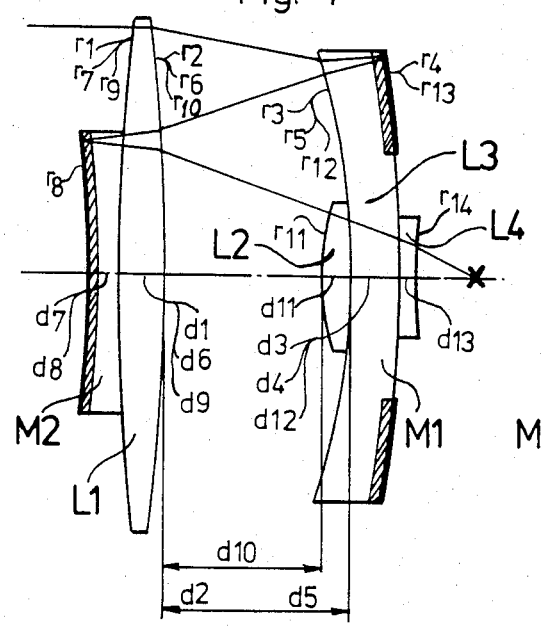
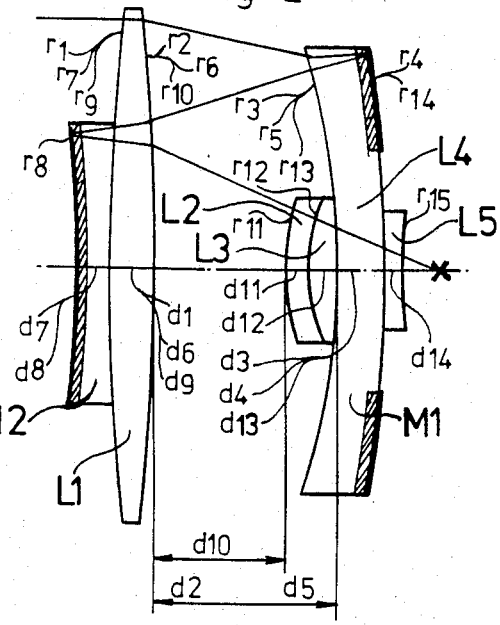
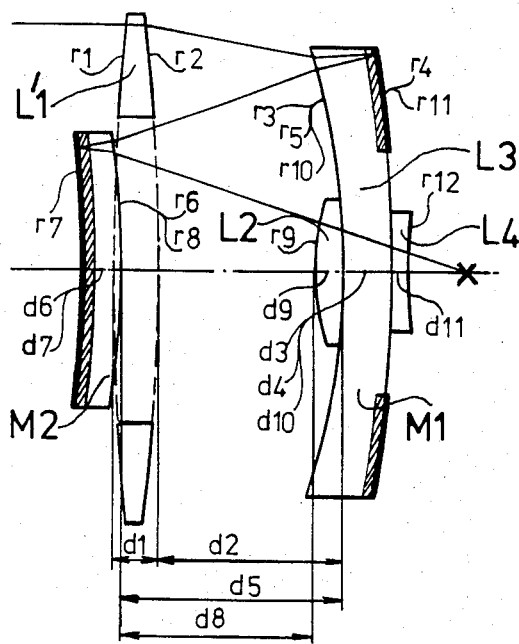
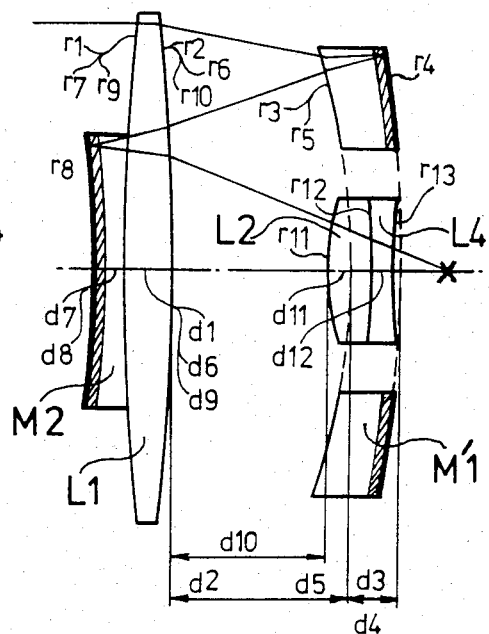

$f = 100$ $\lambda_g = 436\,nm$
$\lambda_d = 588\,nm$
$\lambda_s = 852\,nm$ $f = 100$ ------ mer.
—— sag.

HIGH SPEED CATADIOPTRIC OBJECTIVE LENS SYSTEM

CROSS REFERENCE TO RELATED APPLICATIONS

This application is related to my previously copending U.S. application Ser. No. 967,973, filed Aug. 12, 1978, now U.S. Pat. No. 4,273,425, granted June 16, 1981 and Ser. No. 280,244, filed July 6, 1981, entitled "High Speed Catadioptric Lens System", now U.S. Pat. No. 4,398,809, granted Aug. 16, 1983. This application is a continuation-in-part application of my copending parent application Ser. No. 308,798, filed Oct. 5, 1981, now U.S. Pat. No. 4,456,343, granted June 26, 1984 and entitled "High Speed Catadioptric Objective Lens System".

BACKGROUND OF THE INVENTION

1. Field of the Invention

The present invention relates to an improved high speed catadioptric objective lens system with a front lens, a main mirror lens, a counter mirror and a field lens system.

2. Description of the Prior Art

Heretofore known catadioptric objective lenses are subdivided into two fundamentally different classes of performance with different relative aperture ratio (speed). The objectives of the first mentioned class are the tele-lenses, used in photography. These have a speed of F/5 or less in contrast to the object of the present invention, which is high speed and belongs to the second mentioned class. An example of a tele-lens of the first class with a speed of F/7.4 is disclosed in U.S. Pat. No. 4,188,091.

An example of the class of high speed lenses is disclosed in Swiss Pat. No. 542,454 and by L. Canzek: "Lichtstarkes katadioptrisches Objektiv", Optica Acta, No. 12, 1971 and No. 4, 1972. The focus of this system is situated within the objective, impeding general use.

Other high speed objectives with the focus placed outside of the lens system are disclosed in L. Canzek: "Neue Richtung in der Entwicklung der katadioptrischen Objektive", Optica Acta, No. 2, 1979, and described in my co-pending U.S. application Ser. No. 967,973 filed Aug. 12, 1978, now U.S. Pat. No. 4,273,425. The known high speed objectives, however, have either a considerable length or they are characterized by rather large sphero-chromatic aberrations over a broad spectral range.

The sphero-chromatic aberrations, known also as sphero-chromatism, essentially impair the image quality. The effect of these aberrations is all the more harmful with objectives of large focal distance and when used within a broad spectral range.

It is known in the art (and can be verified from the hereinafter presented Table 1) that the overall length and sphero-chromatism of high speed objectives cannot be reduced at the same time, and this limit may not be overcome by known means.

The overall length essentially depends on the air separation $d_2$ between front lens and main mirror lens, as well as the thickness $d_1$ of the front lens. Spherochromatism $\Delta s'_{\lambda \cdot d}$ for light wavelength $\lambda$ with reference to the fundamental spectral line d is given by $$\Delta s'_{\lambda \cdot d} = (s'_R - s'_o)_\lambda - (s'_R - s'_o)_d,$$

$s'_R$ being the back focal distance of the aperture limited ray and $s'_o$ the back focal distance of the paraxial ray.

A reduction of the aforesaid air separation $d_2$ would result in a shorter, lighter and above all in more handy objective. This would result in a significant progress over the state of the art in view of the fact that overall length is proportional to the focal length and that objectives of this kind are built generally with a great focal length.

As mentioned above, nevertheless, a reduction in overall length up to now has meant poor spherochromatism, thus limiting or even excluding use of such objectives within a broad spectral range or respectively excluding their construction with great focal length.

SUMMARY OF THE PRESENT INVENTION

An important object of the present invention is to therefore provide a high speed catadioptric objective lens with reduced overall length in relation to known systems with approximately equal sphero-chromatism and equal characteristics of performance.

The optical system of this invention comprises, in accordance with the advance of the light rays, a first single lens, a main mirror lens, a countermirror and a field lens system. It satisfies the following conditions:

(1) $d_{CM} > 0$
(2) $f_1 \geq 1.5\, f$
(3) $0.14\, f \leq d_2 \leq 0.53\, f$
(4) $f_{FL} > 0$, wherein reference symbol $d_{CM}$ represents the distance between the reflecting face of the counter mirror and the front face of the first single lens, reference symbol $f_1$ represents the focal length of the first single lens, reference symbol $f$ represents the focal length of the catadioptric lens system, reference symbol $d_2$ represents the air separation between the first single lens and the main mirror lens, and reference symbol $f_{FL}$ represents the focal length of the field lens system.

Combining conditions (1) and (2) permits to obtain a good image quality on-axis, i.e. a good correction of spherochromatic aberrations, whereas combining conditions (1) and (3) allows a short overall length.

Condition (2) allows a front lens with large radii, thus with a small thickness and hence a short overall length of the system. But condition (2) also allows a very high speed, as the aberrations of the front lens may be kept small due to the large radii.

Condition (3) also allows a short overall length. Combining conditions (2) and (3) allows lenses $L_1$, $L'_1$, as well as mirror lenses $M_1$, $M'_1$ with small refractive power, which permits to obtain a good correction with concurrent high speed.

Condition (4) allows an objective with a small Petzval sum and therefore with an anastigmatic and flat (not curved) image over a relatively large field.

BRIEF DESCRIPTION OF THE DRAWINGS

The invention will be better understood and objects other than those set forth above, will become apparent when consideration is given to the following detailed description thereof. Such description makes references to the annexed drawings wherein:

FIGS. 1-6 respectively illustrate schematic cross sections of preferred embodiments of the present invention;

DESCRIPTION OF THE PREFERRED EMBODIMENTS

Figure 7:
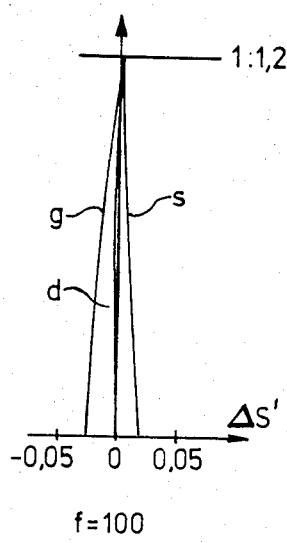
FIG. 7 shows the spherical aberration of an objective according to Example 1 of this invention for the spectral lines d (λ=588 nm), g (λ=436 nm) and s (λ=852 nm)

Examples 1 to 5 are shown in the following tables and will be described with reference to FIGS. 1-5. F is the speed of the lens system, f is the focal length, s' is the back focal distance, $n_d$ is the refractive index and $\nu_d$ is the Abbe's number of the related lens. The aberrations of Examples 2 to 5 are approximately those shown in FIGS. 7 and 8.

EXAMPLE 1

F/1.2
f=99.861
s'=6.785

|       | Face No. | Radius r | Thickness d | $n_d$ | $\nu_d$ |
|-------|----------|----------|-------------|-------|---------|
| $L_1$ | 1  | 340.785   | 6.5  | 1.5168  | 64.2 |
|       | 2  | −375.235  | 36   |         |      |
| $M_1$ | 3  | −120.616  | 8    | 1.5168  | 64.2 |
|       | 4  | −215.820  | −8   | 1.5168  | 64.2 |
|       | 5  | −120.616  | −36  |         |      |
|       | 6  | −375.235  | −6.5 | 1.5168  | 64.2 |
| $M_2$ | 7  | 340.785   | −4   | 1.5168  | 64.2 |
|       | 8  | −1316.482 | 4    | 1.5168  | 64.2 |
|       | 9  | 340.785   | 6.5  | 1.5168  | 64.2 |
|       | 10 | −375.235  | 33   |         |      |
| $L_2$ | 11 | 41.443    | 3    | 1.5168  | 64.2 |
| $L_3$ | 12 | −120.616  | 8    | 1.5168  | 64.2 |
| $L_4$ | 13 | −215.820  | 2    | 1.72825 | 28.4 |
|       | 14 | 379.752   |      |         |      |

EXAMPLE 2

F/1.2
f=100.222
s'=7.782

|       | Face No. | Radius r | Thickness e | $n_d$ | $\nu_d$ |
|-------|----------|----------|-------------|-------|---------|
| $L_1$ | 1  | 325.330   | 7    | 1.5168  | 64.2 |
|       | 2  | −341.869  | 36   |         |      |
| $M_1$ | 3  | −118.844  | 8    | 1.5168  | 64.2 |
|       | 4  | −220.975  | −8   | 1.5168  | 64.2 |
|       | 5  | −118.844  | −36  |         |      |
|       | 6  | −341.869  | −7   | 1.5168  | 64.2 |
| $M_2$ | 7  | 325.330   | −4   | 1.5168  | 64.2 |
|       | 8  | −1252.819 | 4    | 1.5168  | 64.2 |
|       | 9  | 325.330   | 7    | 1.5168  | 64.2 |
|       | 10 | −341.869  | 30   |         |      |
| $L_2$ | 11 | 41.468    | 2    | 1.72825 | 28.4 |
| $L_3$ | 12 | 30.859    | 4    | 1.5168  | 64.2 |
| $L_4$ | 13 | −118.844  | 8    | 1.5168  | 64.2 |
| $L_5$ | 14 | −220.975  | 2    | 1.72825 | 28.4 |
|       | 15 | 512.978   |      |         |      |

EXAMPLE 3

F/1.2
f=100.584
s'=6.480

|        | Face No. | Radius r | Thickness d | $n_d$ | $\nu_d$ |
|--------|----------|----------|-------------|-------|---------|
| $L'_1$ | 1 | 340.832 | 7.5 | 1.5168 | 64.2 |

-continued

|       | Face No. | Radius r | Thickness d | $n_d$ | $\nu_d$ |
|-------|----------|----------|-------------|-------|---------|
|       | 2  | −389.864  | 35   |         |      |
| $M_1$ | 3  | −120.613  | 8    | 1.5168  | 64.2 |
|       | 4  | −215.796  | −8   | 1.5168  | 64.2 |
|       | 5  | −120.613  | −38  |         |      |
| $M_2$ | 6  | −375.235  | −8.5 | 1.5168  | 64.2 |
|       | 7  | −1315.789 | 8.5  | 1.5168  | 64.2 |
|       | 8  | −375.235  | 35   |         |      |
| $L_2$ | 9  | 44.617    | 3    | 1.5168  | 64.2 |
| $L_3$ | 10 | −120.613  | 8    | 1.5168  | 64.2 |
| $L_4$ | 11 | −215.796  | 2    | 1.72825 | 28.4 |
|       | 12 | 379.795   |      |         |      |

EXAMPLE 4

F/1.2
f=99.799
s'=7.427

|        | Face No. | Radius r | Thickness d | $n_d$ | $\nu_d$ |
|--------|----------|----------|-------------|-------|---------|
| $L_1$  | 1  | 334.001   | 6.5  | 1.5168  | 64.2 |
|        | 2  | −373.972  | 35.9 |         |      |
| $M'_1$ | 3  | −120.207  | 8    | 1.5168  | 64.2 |
|        | 4  | −214.869  | −8   | 1.5168  | 64.2 |
|        | 5  | −120.207  | −35.9|         |      |
|        | 6  | −373.972  | −6.5 | 1.5168  | 64.2 |
| $M_2$  | 7  | 334.001   | −4   | 1.5168  | 64.2 |
|        | 8  | −1310.616 | 4    | 1.5168  | 64.2 |
|        | 9  | 334.001   | 6.5  | 1.5168  | 64.2 |
|        | 10 | −373.972  | 32.8 |         |      |
| $L_2$  | 11 | 41.120    | 7.7  | 1.5168  | 64.2 |
| $L_4$  | 12 | −150.218  | 4    | 1.72825 | 28.4 |
|        | 13 | 625.000   |      |         |      |

EXAMPLE 5

F/1.2
f=99.997
s'=7.263

|        | Face No. | Radius r | Thickness d | $n_d$ | $\nu_d$ |
|--------|----------|----------|-------------|-------|---------|
| $L'_1$ | 1  | 335.570   | 7.4  | 1.5168  | 64.2 |
|        | 2  | −383.730  | 34.4 |         |      |
| $M'_1$ | 3  | −118.737  | 7.9  | 1.5168  | 64.2 |
|        | 4  | −212.450  | −7.9 | 1.5168  | 64.2 |
|        | 5  | −118.737  | −37.4|         |      |
| $M_2$  | 6  | −369.413  | −8.4 | 1.5168  | 64.2 |
|        | 7  | −1295.337 | 8.4  | 1.5168  | 64.2 |
|        | 8  | −369.413  | 35.3 |         |      |
| $L_2$  | 9  | 39.807    | 6.9  | 1.5168  | 64.2 |
| $L_4$  | 10 | −148.390  | 3.9  | 1.72825 | 28.4 |
|        | 11 | 461.467   |      |         |      |

All five Examples each consist of a front or first single lens $L_1$, $L'_1$, a main mirror lens $M_1$, $M'_1$, a counter mirror $M_2$ and a field lens system $L_2$, $L_3$, $L_4$, $L_5$.

Figure 8:
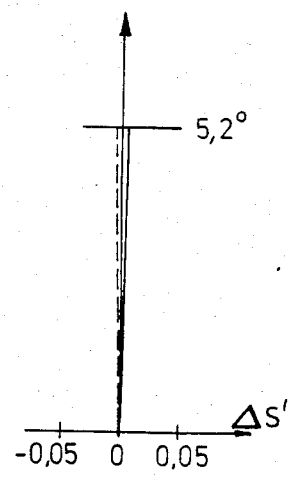
FIG. 8 shows the astigmatism of the objective according to Example 1 of the present invention.

Conditions (1), (2), (3) and (4) hold for all 5 Examples. As may be seen from FIG. 7, spherical aberration and spherochromatic aberrations of these examples may be corrected very well even at a very high speed. Examples 1 to 5 have an anastigmatic and flat image over a relatively large field, as shown in FIG. 8.

Example 1, as shown in FIG. 1 is one objective according to the invention, that allows construction with the most simple shape. All lens elements except single field lens components are made of the same type of glass. This holds true also, for Examples 2 to 5 in order to avoid the secondary spectrum.

An even better chromatic correction is effected by adding one lens element to the field lens system as in Example 2, which is shown in FIG. 2.

System mass may be reduced by boring out the central part of the front lens $L'_1$ as in Example 3, which is shown in FIG. 3. These and the subsequent types of lenses ease correction of image aberrations by providing additional independent correction parameters. Reduction of system mass may likewise be achieved by boring out the central part of the main mirror lens $M'_1$, as in respectively Example 4 or 5, which is represented in respectively FIG. 4 or 5. This allows a substantial simplification of the field lens system, which in this case may even be reduced to one single lens. The system focus as well as the field lens system may thus be arranged within the inner portion of the objective.

Figure 5:
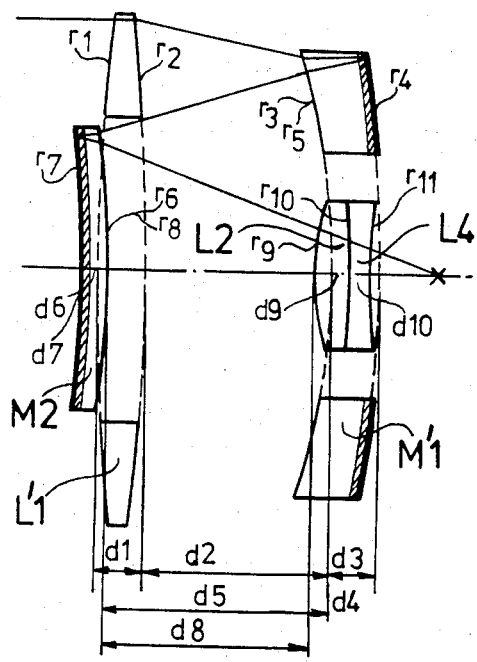

Example 5, as shown in FIG. 5 has both main optical elements $L'_1$ and $M'_1$ provided with central bores, allowing a very light construction.

Figure 6:
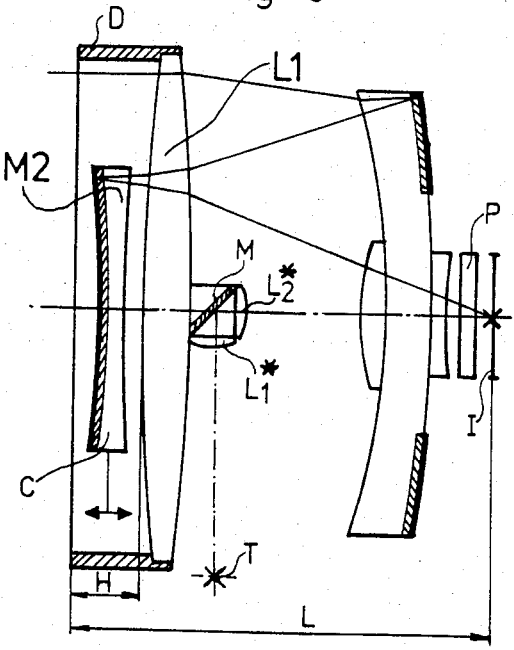

The counter mirror may be provided as a separate element C as shown in FIG. 6. This mirror C may be shiftable with respect to the rest of the objective for various effects, e.g. for focussing purposes. The element C may also be tilted relative to the optical system axis, it may be shifted along or transversal to that axis and a change in relative position may also be accomplished by a combination of these motions.

Focussing with the counter mirror C on a near object is of particular advantage in cases where a reticle or aiming mark T is projected on the image plane I of the objective by means of a lens system $L\omega_1$, $L\omega_2$ and a mirror M. Thus, the distance TI remains constant during focussing operations without effect on magnification and sharpness of the image of reticle T. Focussing by counter mirror C has still another advantage, when the inner part of the system must be kept completely sealed.

If the field lens system $L_2$, $L_4$ is provided as a separate unit as shown in FIGS. 4 and 5, its position within the rest of the system may be changed in the same way as described above for the counter mirror.

The counter mirror $M_2$ may also, of course, be a surface mirror, in contrast to the mirror lens $M_2$ shown in FIGS. 1 to 6, without departing from the scope and teachings of the invention. Other modifications of the objectives according to the present invention are well suited for use with image intensifier tubes, particularly those of the third generation, which are provided with a glass plate P in front of the image plane I as shown in FIG. 6.

Other modifications of the present invention are systems made of material suited for use within the ultraviolet or infrared spectral ranges (including the so-called thermal image generation). As known in the art such material usually has refraction numbers different from those of glasses for the visual range, thus the person skilled in the art will have to conduct adaptive calculations known as such to obtain other lens data that may differ substantially from those given in Examples 1 to 5.

It has been found that mirror lens objectives according to the present invention can be realized with a comparatively short length but at the same time with a high aperture ratio, as well as an excellent image quality over a broad spectral range.

Table 1 gives a comparison between examples of the present invention and of the state of the art. All systems are based on a common focal length $f=100$ and a common speed F/1.2. Evidently, sphero-chromatism of the Examples according to the present invention is about the same as that of the best state-of-the-art system, i.e. U.S. patent application Ser. No. 967,973, new U.S. Pat. No. 4,273,425 (see Table 1, Example No. 3). But this known system has a distance $d_2=53.7$ between front lens and main mirror lens that exceeds $d_2$ according to the present invention by about 50%, and the ratio of overall lengths is even greater if a required sunshade D (see FIG. 6) is taken in consideration.

TABLE 1

| $f = 100$ | Example No. | Distance $d_2$ | Sphero-chromatism $\Delta s'_{gd}$ for F/1.2 |
|---|---|---|---|
| U.S. Pat. Application Ser. No. 967,973 (U.S. Pat. No. 4,273,425) | 1 | 46.9 | 0.038 |
| | 2 | 47.1 | 0.038 |
| | 3 | 53.7 | 0.021 |
| | 4 | 46.7 | 0.042 |
| U.S. Pat. Application Ser. No. 280,244 (U.S. Pat. No. 4,398,809) | 1 | 43 | 0.045 |
| | 2 | 43 | 0.046 |
| | 3 | 43 | 0.042 |
| Present Application | 1 | 36 | 0.022 |
| | 2 | 36 | 0.024 |
| | 3 | 35 | 0.022 |
| | 4 | 36 | 0.024 |
| | 5 | 34.4 | 0.026 |

If the length H of a sunshade D (see FIG. 6) is added to the overall length of the objective, the distance L from the outer rim of sunshade D to the location of the image I of all the known examples of Table 1 exceeds L according to the present invention by at least 55%, other characteristics, e.g. visual field, central obstruction, being equal on both sides. Consideration of FIGS. 1–6 may lead to the conclusion, that location of counter mirror $M_2$ in front of the front lens $L_1$, $L'_1$ would increase the overall system length by at least the thickness of the counter mirror lens $M_2$. But this is not so, as the required sunshade for the disclosed systems protrudes past the counter mirror. Also, attachment of a field lens $L_4$, $L_5$ behind the main mirror lens $M_1$ does not prolong the space required by the lens system, as, in general, the back focal distance may be shortened by the thickness of this lens $L_4$, $L_5$.

For most applications, the image quality of Examples 1 to 5 of the present invention allows for an increase of the specified aperture ratio of F/1.2, and the focal distance of $f=100$ without perceptibly impairing performance.

As glasses of low price, which are light and have a good suitability for production (e.g. BK 7 type) may be used for objectives according to the present invention with a rather simple optical structure, light and very handy systems of low production cost are available. One area for suitable application is optoelectronics, where high contrast imaging for good detectability of low contrast objects is of paramount importance. Generally, these objectives are suitable for all applications with maximum requirements of speed and image quality.

The present invention also differs essentially from those catadioptric objectives that have been designated above as photographic tele-lenses.

A first considerable difference is in the speeds. As evident from FIG. 4 of U.S. Pat. No. 4,188,091, granted Feb. 12, 1980, the object of this patent allows a speed of F/7.4, whereas FIG. 7 of the present invention shows an example with a speed of F/1.2. This means an advantage of 38 times more light for the example of FIG. 7.

Other substantial differences concern the field angles of the objectives. FIG. 8 of the present invention shows an anastigmatic and flat field with a semi-field angle of 5.2 degrees. This exceeds by more than 100% the data shown in FIG. 3 and 4 of U.S. Pat. No. 4,188,091, where a semi-field angle of only 2.5 degrees is indicated.

These great differences of performance in speed and field angle are due to the fact that the lenses of U.S. Pat. No. 4,188,091 do not fulfil conditions (2), (3) and (4) of the present invention, as the sign of the focal length in condition (4) is reversed.

As may be seen from L. Canzek: "Bildfehler dritter Ordnung von klassischen Speigelobjektiven mit sphärischen Flächen", Optik 57, 1980, for reduction of image errors of catadioptric objectives the distance between main mirror and counter mirror must be made as large as possible. This object, among others, has been achieved, according to the invention, with a concurrent reduction of overall length, by placing the counter mirror in front of the front lens.

This rather simple method is indicated nowhere within the broad relevant literature on the state-of-the-art of catadioptric objectives. Known solutions, on the contrary, have resulted by proceeding in the contrary direction, namely by silvering the counter mirror on the front lens itself or by placing it at the interior of the lens system.

It will be appreciated that various modifications and changes of the preferred embodiments, some of which have been described above, may be made without leaving the scope of this invention as defined in the accompanying claims.

Accordingly, what I claim is:

1. A catadioptric lens system comprising in the order of the transmission of a regular light ray:
    a first single lens;
    a main mirror lens;
    a counter mirror located on the object side in front of the first single lens, and
    a field lens system, wherein the catadioptric lens system satisfies the following conditions:
    (1) $d_{CM} > 0$
    (2) $f_1 \geq 1.5f$
    (3) $0.14f \leq d_2 \leq 0.53f$
    (4) $f_{FL} > 0$,
    wherein reference symbol $d_{CM}$ represents the distance between the reflecting face of the counter mirror and the front face of the first single lens, $d_{CM}$ being positive, as the counter mirror is on the object side in front of the first single lens, reference symbol $f_1$ represents the focal length of the first single lens, reference symbol $f$ represents the focal length of the catadioptric lens system, reference symbol $d_2$ represents the air separation between the first single lens and the main mirror lens, and reference symbol $f_{FL}$ represents the focal length of the field lens system.

2. The catadioptric lens system according to claim 1, in which the first single lens and the main mirror lens consist of glass of the same type.

3. The catadioptric lens system according to claim 1, comprising a reflecting-refracting counter mirror.

4. The catadioptric lens according to claim 3, comprising a reflecting-refracting counter mirror mounted to a central portion of the front lens.

5. The catadioptric lens system according to claim 1, comprising a centrally bored front lens.

6. The catadioptric lens system according to claim 1, comprising a centrally bored main mirror lens.

7. The catadioptric lens system according to claim 1, comprising a counter mirror possessing a variable position within the objective.

8. The catadioptric lens system according to claim 6, comprising a field lens system possessing a variable position within the objective.

9. The catadioptric lens system according to claim 1, comprising optical elements made from material which is transparent beyond the visual light spectral range.

* * * * *